United States Patent [19]
Hannan et al.

[11] 4,221,465
[45] Sep. 9, 1980

[54] PATCHING TAPE FOR DIFFRACTIVE SUBTRACTIVE FILTER VIEWGRAPHS

[75] Inventors: William J. Hannan; Harry J. Woll, both of Concord, Mass.

[73] Assignee: RCA Corporation, New York, N.Y.

[21] Appl. No.: 946,721

[22] Filed: Sep. 28, 1978

[51] Int. Cl.² .............................................. G02B 27/38
[52] U.S. Cl. .................................. 350/162 SF; 428/167
[58] Field of Search .................... 350/162 SF, 162 R; 428/156, 167, 913

[56] References Cited

U.S. PATENT DOCUMENTS

| | | | |
|---|---|---|---|
| 3,516,730 | 6/1970 | Wood | 350/162 R |
| 3,957,354 | 12/1979 | Knop | 350/162 R X |
| 4,062,628 | 12/1977 | Gale | 350/162 R |

OTHER PUBLICATIONS

*Electronics*, "Microfiche in Color Made by Diffraction", vol. 49, No. 15, pp. 4E, 6E, Jul. 22, 1976.

*Primary Examiner*—John K. Corbin
*Assistant Examiner*—Bruce Y. Arnold
*Attorney, Agent, or Firm*—Samuel Cohen; George J. Seligsohn

[57] ABSTRACT

A patching tape, comprising a diffraction grating structure embossed in one face of a transparent plastic tape and a conformal adhesive covering the other face thereof, is used both for correcting informational errors and for producing contrasting color stripes in formal diffractive subtractive filter viewgraphs.

4 Claims, 5 Drawing Figures

INDEX MATCHING ADHESIVE

PATCHING TAPE FOR DIFFRACTIVE SUBTRACTIVE FILTER VIEWGRAPHS

This invention relates to diffractive subtractive filter viewgraphs and, more particularly, to diffractive subtractive filter patching tapes useful in fabricating such viewgraphs.

Reference is made to U.S. Pat. No. 3,957,354, issued to Knop on May 18, 1976, and to U.S. Pat. No. 4,062,628, issued to Gale on Dec. 13, 1977. U.S. Pat. No. 3,957,354 teaches that the illumination with white light of a rectangular profile diffraction grating, embossed as a relief pattern on the surface of a thermoplastic film, derives zero diffraction order output light exhibiting a selected color hue. This selected color hue is determined by the amplitude of the rectangular profile grating and the relative index of refraction of the thermoplastic film with respect to that of its surroundings. U.S. Pat. No. 4,062,628 teaches that a diffractive subtractive filter illuminated with white light produces substantially neutral black zero diffraction order output, if the filter diffractive structure comprises two embossed sinusoidal profiles each having a different appropriate amplitude. However, the white illuminating light appears as zero diffraction order output light when no diffractive structure is present. U.S. Pat. No. 4,062,628 also teaches that a gray scale can be achieved by the use of screening which controls the relative proportion of the area of a region in which diffractive structures are present (black-manifesting) compared to that in which diffractive structures are absent (white-manifesting).

Reference is also made to copending U.S. patent application Ser. No. 877,855, filed Feb. 15, 1978 by Gale et al. and assigned to the same assignee as the present invention. Application Ser. No. 877,855 teaches that local obliteration of either a sinusoidal or a rectangular profile diffractive structure (manifesting either black or a particular color hue zero diffraction order light) results in the locally obliterated area manifesting white zero diffraction order light. The local obliteration, which may represent a selected spatial information pattern, can be acomplished in various ways. One such way is by utilizing, as an ink, a liquid having an index of refraction substantially equal to that of the thermoplastic. Preferably, this liquid ink should be fast drying to avoid any distortion of the written pattern due to capillary action by the grating lines of the diffractive structure. Such an ink may comprise an organic substance such as an index-matching polymer, dissolved in a volatile solvent. Another way to achieve local obliteration is by impact pressure, such as from a typewriter key (assuming the thermoplastic is of a type which cold flows sufficiently under impact pressure).

As is known in the art, a viewgraph comprises a large-area slide, (usually 9×11″) containing visual information which may be projected on a screen. An informal viewgraph may consist of only a clear plastic sheet having information handwritten thereon with a grease pencil. However, formal viewgraphs, of the type commonly used for business presentations, are presently fabricated by a relatively expensive time-consuming photographic process. This process includes the steps of:

(1) Preparing original copies (art work) in the form of black print on a light background;

(2) exposing a 9×11″ black-and-white photographic film to create a negative of the original copy (i.e. transparent printing on a black background); and (3) when desired, sticking colored tape over transparent print to produce colored print.

This process, which requires raw materials (film and developers), preparation of art work, exposure and development processes and color taping, is inherently high in cost. However, the high cost increases even further if changes are required because, except for deleting information, conventional photography does not accommodate changes. Thus, change usually demands remaking an entire viewgraph. In addition, the preparation of art work, photographic processing and color taping are time consuming tasks. Furthermore, heat absorption from the projectors often damage conventionally prepared viewgraphs.

The present invention, which applies the teachings of the aforesaid patent application Ser. No. 877,855 to the preparation of viewgraphs, is directed to a diffractive subtractive filter patching tape and the use thereof in the preparation of the viewgraphs. This patching tape, which may be composed of a diffraction grating embossed on one face of a plastic tape, includes an index-matching, conformal adhesive on the other face thereof. The matching tape may be used for such purposes as correcting errors in the information originally written on the viewgraph, or, alternatively, producing a stripe of a different color from the background color of the viewgraph.

Figure 1:
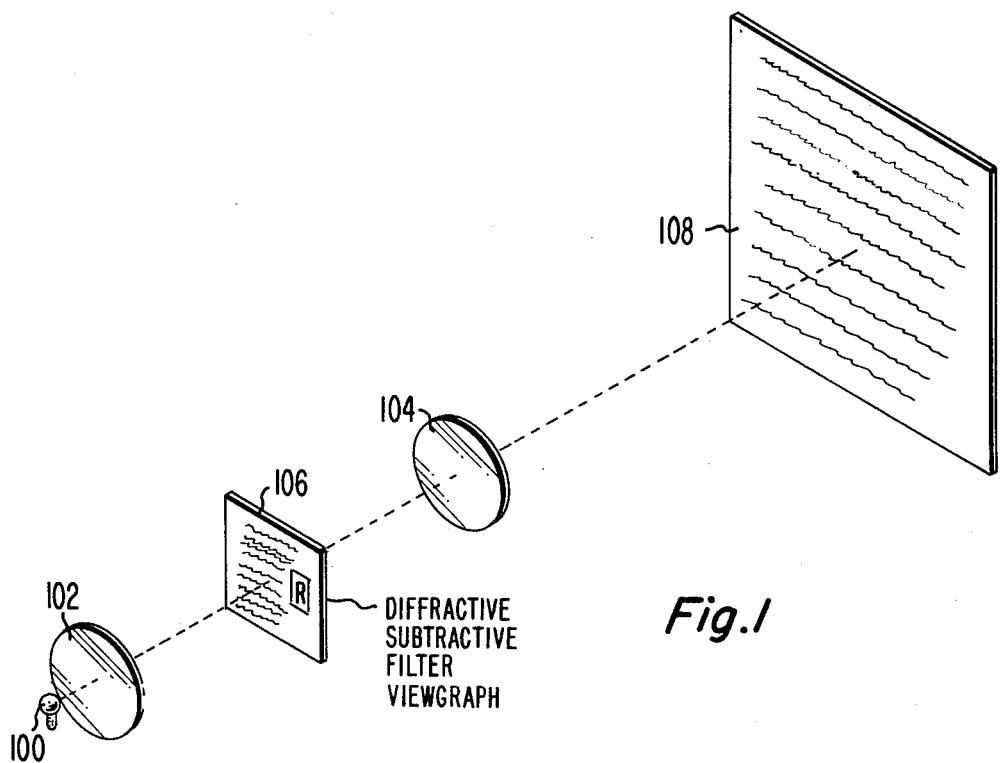
FIG. 1 is a schematic drawing of an arrangement for projecting a diffractive subtractive filter viewgraph.

A conventional viewgraph projector includes a light source, such as projection lamp 100, condensing optics, such as condensing lens 102, and imaging optics, such as imaging lens 104. The viewgraph (which, in accordance with the present invention, is a diffractive subtractive filter viewgraph 106) is situated between condensing lens 102 and imaging lens 104 and is illuminated by white light from projection lamp 100. Output light emerging from the viewgraph, which is within the aperture of imaging lens 104, is projected onto screen 108. If, as in the present case, the viewgraph is a diffractive subtractive filter viewgraph, the zero order output light emerging from view graph 106 is within the aperture of imaging lens 104, while all higher diffraction order output light emerging from the viewgraph 106 is outside of the aperture of imaging lens 104.

Figure 1A:
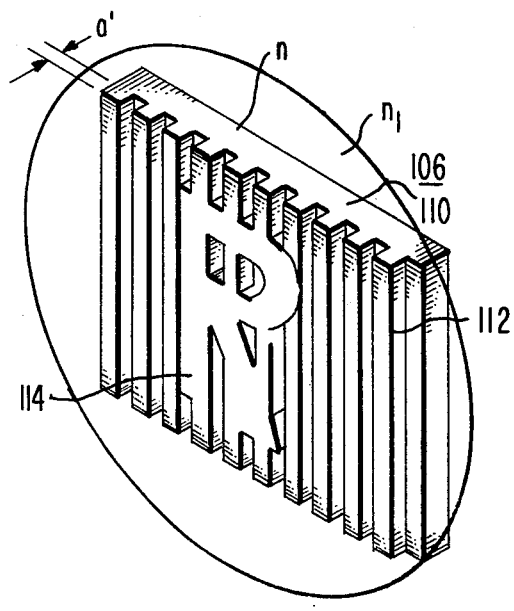
FIG. 1a illustrates in detail a typical fragment of information recorded on a portion of the viewgraph of FIG. 1.

As is more clearly shown in FIG. 1a, viewgraph 106 comprises a transparent, preferably clear thermoplastic sheet 110 having diffraction grating 112 embossed on a face thereof. In FIG. 1a it is assumed that the diffractive subtractive filter is a color filter. In this case, grating 112 has the rectangular profile shown in FIG. 1a. The color hue of the zero diffraction order output light on such a filter is determined by the amplitude a′ of the rectangular profile multiplied by the difference in the index of refraction n of the thermoplastic 110 and the index of refraction $n_1$ of its surroundings. Usually these surroundings comprise air having an index of refraction of unity. Although not specifically shown, diffractive substractive filter viewgraph 106 may be a black diffractive subtractive filter, of the type disclosed in the aforesaid U.S. Pat. No. 4,062,628. In this case, thermoplastic 110 is embossed with one or more sinusoidal profile gratings, rather than with rectangular profile grating 112 shown in FIG. 1a.

In any case, information is written on diffractive substractive filter viewgraph 106 by obliterating a portion of the grating. By way of example, as shown in FIG. 1a, the letter R is written on viewgraph 106 with a clear ink, which has an index of refraction which is substantially identical to that of thermoplastic 110. This ink fills the grooves of grating 112, thereby providing substantially non-diffractive region 14 which delineates the R information. Since region 114 is non-diffractive, the output light emerging from viewgraph 106, which is within the aperture of imaging lens 104, remains white. Thus, the information written on viewgraph 106, such as the R delineated by the region 114, is projected onto screen 108 as white areas surrounded by a colored or black background determined by the non-obliterated diffractive structure (such as grating 112) in FIG. 1a.

Figure 2:
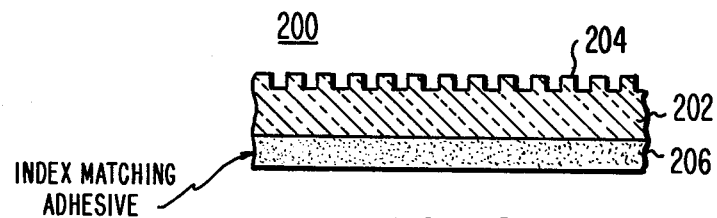
FIG. 2 illustrates patching tape employing the principles of the present invention.

Referring to FIG. 2, there is shown patching tape 200 embodying the present invention. Specifically, patching tape 200 comprises a thermoplastic tape 202 having an index of refraction substantially the same as that of thermoplastic 110 of viewgraph 106. Preferably, thermoplastic tape 202 and thermoplastic 110 are composed of the same material. One face of thermoplastic tape 202 has diffraction grating 204 embossed therein. Grating 204 may have the same profile and amplitude as grating 112 of viewgraph 106 or, alternatively, grating 204 may have a different profile and/or amplitude than that of grating 112 of viewgraph 106. In any case, the other face of thermoplastic 202 is covered with an adhesive 206 having an index of refraction substantially equal to that of thermoplastic tape 202 and thermoplastic 110. Further, adhesive 206 is a conformal adhesive, i.e., it will flow under light pressure to intimately contact the crests and valleys of any underlying grating on viewgraph 106. For instance, when thermoplastic 202 and thermoplastic 112 are cellulose acetate, adhesive 206 may be ethyl acetate.

Figure 3A:
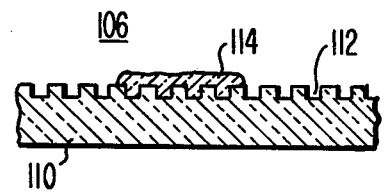
FIGS. 3a and 3b illustrate the typical manner of employing the patching tape of FIG. 2 to erase information originally written on a diffractive subtractive filter.

Patching tape 204 is useful in correcting information errors written on viewgraph 106. In this case, the profile and amplitude of grating 204 is identical in all respects to the profile and amplitude of grating 112 of viewgraph 106. For instance, as shown in FIG. 3a, the information 114, such as the letter R originally written on viewgraph 106, may be in error. As shown in FIG. 2a, information 114, written with index matching ink, fills and obliterates a portion of grating 112 in the face of thermoplastic 110 of viewgraph 106.

Figure 3B:
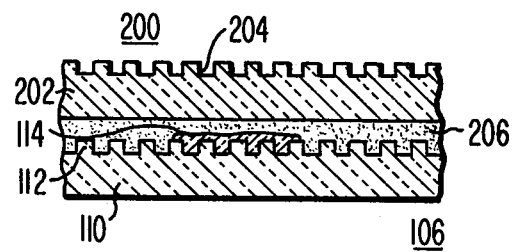

A shown in FIG. 3b, matching tape 200 may be easily applied to a portion of the viewgraph 106 which contains the erroneous information 114. Specifically, index matching adhesive 206 conforms to and obliterates both the underlying grating 112 and writing 114 of viewgraph 106. However, grating 113 and information 114 is replaced with grating 204. Since grating 204 has an identical profile and amplitude as grating 112, the only optical effect is to merely remove information 114. Of course, new information may now be written with index matching ink on grating 204. In this manner, viewgraph informational errors are erased and replaced with correct information.

Preferably, there are four standard varieties of patching tape 200. One for each of the primary colors (i.e., a rectangular grating of appropriate amplitude) and one for black (a sinusoidal profile diffractive structure). When grating 204 of patching tape 200 and grating 212 of the underlying viewgraph 106 are of the same amplitude as each other (correspond to the same color), patching tape 200 is used as an information-correcting tape, as described above. However, a patching tape 200 having a grating 204 corresponding to a different color from that corresponding to grating 112 of underlying the graph of 106 is useful in inserting a stripe of a contrasting color on viewgraph 106. If it is desired, information may be written on this strip of contrasting color by obliterating a portion of grating 204 in accordance with the information to be delineated.

What is claimed is:

1. A diffractive subtractive filter patching tape, comprising a transparent thermoplastic tape having a predetermined diffractive structure embossed solely on one of two opposing faces thereof, and a conformal adhesive material having an index of refraction substantially equal to that of said thermoplastic tape covering the other of said two opposing faces.

2. In combination:
   a diffractive subtractive filter viewgraph comprising a transparent thermoplastic sheet exhibiting a given index of refraction and having a given diffractive structure embossed on a face thereof, and
   a diffractive subtractive patching tape comprising a thermoplastic tape exhibiting substantially said given index of refraction and having a predetermined diffractive structure embossed solely on one of two opposing faces thereof, and a conformal adhesive material having substantially said given index of refraction covering the other of said two opposing faces, said patching tape being attached by said adhesive material to a selected region of said thermoplastic sheet of said viewgraph.

3. The combination defined in claim 2, wherein a part of said given diffractive structure situated within at least a portion of said selected region is obliterated in accordance with an erroneous information pattern, and wherein said predetermined diffractive structure is substantially identical to said given diffractive structure, whereby said erroneous information pattern is erased by said attached patching tape.

4. The combination defined in claim 2, wherein said predetermined diffractive structure comprises a rectangular-profile diffraction grating having a predetermined amplitude such that zero-order diffraction output light derived from said patching tape in response to illumination with white light exhibits a certain color hue, and wherein said predetermined diffractive structure is different from said given diffractive struoture, whereby said selected region exhibits a different color hue.

* * * * *